United States Patent
Jeong et al.

(10) Patent No.: US 11,880,590 B2
(45) Date of Patent: Jan. 23, 2024

(54) DATA PROCESSING SYSTEM AND METHOD FOR ACCESSING HETEROGENEOUS MEMORY SYSTEM INCLUDING PROCESSING UNIT

(71) Applicant: SAMSUNG ELECTRONICS CO., LTD., Suwon-si (KR)

(72) Inventors: Wonseb Jeong, Suwon-si (KR); Hongju Kal, Seoul (KR); Won Woo Ro, Seoul (KR); Seokmin Lee, Gyeongsangbuk-do (KR); Gun Ko, Gunpo-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/837,286

(22) Filed: Jun. 10, 2022

(65) Prior Publication Data
US 2022/0398032 A1 Dec. 15, 2022

(30) Foreign Application Priority Data

Jun. 10, 2021 (KR) .................. 10-2021-0075745
Sep. 3, 2021 (KR) .................. 10-2021-0117942

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | |
|---|---|---|
| 10,416,896 B2 | 9/2019 | O et al. |
| 10,474,600 B2 | 11/2019 | Malladi et al. |
| 10,545,860 B2 | 1/2020 | Malladi et al. |
| 10,747,691 B2 | 8/2020 | Schmisseur et al. |

(Continued)

FOREIGN PATENT DOCUMENTS

| | | |
|---|---|---|
| CN | 111124675 A | 5/2020 |
| KR | 10-2019-0017639 A | 2/2019 |

(Continued)

OTHER PUBLICATIONS

Chou, Chiachen et al., "BEAR: Techniques for Mitigating Bandwidth Bloat in Gigascale DRAM Caches", Computer Science, 2015 ACM/IEEE 42nd Annual International Symposium on Computer Architecture, Jun. 13, 2015,, pp. 198-210. (14 pages total).

(Continued)

*Primary Examiner* — Edward J Dudek, Jr.
(74) *Attorney, Agent, or Firm* — Sughrue Mion, PLLC

(57) ABSTRACT

A data processing system and method for accessing a heterogeneous memory system including a processing unit are provided. The heterogeneous memory system includes a memory module and high bandwidth memory (HBM) including a processing-in-memory (PIM) circuit combined with a memory controller. The memory controller is configured to detect a data array required for an arithmetic operation from a memory module or the HBM by using a border index value when the arithmetic operation is performed by the PIM circuit of the HBM and generate a memory module command set and an HBM command set using physical address spaces respectively designated in the memory module and the HBM.

20 Claims, 10 Drawing Sheets

(56) References Cited

U.S. PATENT DOCUMENTS

| | | | |
|---|---|---|---|
| 10,866,900 | B2 | 12/2020 | Chang et al. |
| 11,119,677 | B2 | 9/2021 | Gu et al. |
| 11,176,046 | B2 | 11/2021 | Liao et al. |
| 11,194,579 | B2 | 12/2021 | Shin et al. |
| 11,221,953 | B2 | 1/2022 | Jo et al. |
| 2013/0111107 | A1* | 5/2013 | Chang ............ G06F 12/10 711/E12.078 |
| 2014/0040532 | A1 | 2/2014 | Watanabe et al. |
| 2017/0277441 | A1* | 9/2017 | Gupta ............ G06F 12/02 |
| 2018/0165209 | A1* | 6/2018 | Poxon ............ G06F 12/023 |
| 2019/0042251 | A1* | 2/2019 | Nurvitadhi ........ G06F 9/30036 |
| 2020/0152310 | A1 | 5/2020 | Park |
| 2020/0294558 | A1 | 9/2020 | Yu et al. |
| 2021/0224185 | A1* | 7/2021 | Zhou ............ G06F 9/5011 |
| 2021/0349820 | A1* | 11/2021 | Kutch ............ G06F 12/0802 |
| 2021/0374055 | A1* | 12/2021 | Aga ............ G06F 12/0646 |
| 2022/0188233 | A1* | 6/2022 | Kalamatianos ..... G06F 12/0815 |
| 2022/0206869 | A1* | 6/2022 | Ramachandran ..... G06F 3/0673 |

FOREIGN PATENT DOCUMENTS

| | | |
|---|---|---|
| KR | 10-2019-0072404 A | 6/2019 |
| KR | 10-2019-0100632 A | 8/2019 |
| KR | 10-2020-0039930 A | 4/2020 |
| KR | 10-2022-0032805 A | 3/2022 |

OTHER PUBLICATIONS

Chou, Chiachen et al., "CAMEO: A Two-Level Memory Organization with Capacity of Main Memory and Flexibility of Hardware-Managed Cache", MICRO-47: Proceedings of the 47th Annual IEEE/ACM International Symposium on Microarchitecture, Dec. 2014, pp. 1-12, https://doi.org/10.1109/MICRO.2014.63. (13 pages total).

Ke, Liu et al., "RecNMP: Accelerating Personalized Recommendation with Near-Memory Processing", 2020 ACM/IEEE 47th Annual International Symposium on Computer Architecture (ISCA), May 30, 2022-Jun. 3, 2020, pp. 790-803. 915 pages total).

Kwon, Youngeun et al., "TensorDIMM: A Practical Near-Memory Processing Architecture for Embeddings and Tensor Operations in Deep Learning", arViv:1908.03072v2 [cs.lg], Aug. 25, 2019, pp. 740-753, https://doi.org/10.48550/arXiv.1908.03072. (15 pages total).

Sim, Jaewoong et al., "Transparent Hardware Management of Stacked DRAM as Part of Memory", 2014 47th Annual IEEE/ACM International Symposium on Microarchitecture, Dec. 13-17, 2014. (13 pages total).

Communication dated May 4, 2022 by the Korean Intellectual Property Office in counterpart Korean Patent Application No. 10-2021-0117942.

Communication dated Nov. 10, 2022, issued by the European Patent Office in counterpart European Application No. 22178305.3.

Kal et al., "SPACE: Locality-Aware Processing in Heterogeneous Memory for Personalized Recommendations," 2021 ACM/IEEE 48th Annual International Symposium on Computer Architecture (ISCA), pp. 679-691, 2021, XP033951907, DOI 10.1109/ISCA52012.2021.00059.

Gao et al., "Tetris: Scalable and Efficient Neural Network Acceleration with 3D Memory," ACM, ASPLOS '17, Apr. 2017, pp. 751-764, 2017, XP058338264, DOI: http://dx.doi.org/10.1145/3037697.3037702.

\* cited by examiner

FIG. 5A

| OpCode | Vector Size | Source | Destination | ⟵ 530 |
|--------|-------------|--------|-------------|-------|
| Add.M  | Vector Size | HBM Addr | Register ID | |

FIG. 5B

| OpCode | Vector Size | Vector Position | Immediate value | Destination | ⟵ 520 |
|--------|-------------|-----------------|-----------------|-------------|-------|
| Add.I  | Vector Size | Vector Pos      | Part of Vector  | Register ID | |

DATA PROCESSING SYSTEM AND METHOD FOR ACCESSING HETEROGENEOUS MEMORY SYSTEM INCLUDING PROCESSING UNIT

CROSS-REFERENCE TO RELATED APPLICATIONS

This application is based on and claims priority under 35 U. S. C. § 119 to Korean Patent Application Nos. 10-2021-0075745 and 10-2021-0117942, filed on Jun. 10, 2021 and Sep. 3, 2021, in the Korean Intellectual Property Office, the disclosures of which are incorporated by reference herein in their entirety.

BACKGROUND

The disclosure relates to apparatuses and methods, and more particularly, to a data processing system and method for accessing a heterogeneous memory system including a processing unit.

Typically, memory processing is performed on a single memory. The performance and characteristics of the memory processing may be determined by the single memory. A high capacity memory module, for example, a dual in-line memory module (DIMM), may be used in application processing that requires large memory capacity. A high bandwidth memory device, for example, high bandwidth memory (HBM), may be used in application processing that requires a high bandwidth. The single memory may be used as a high capacity DIMM or the HBM A high bandwidth memory operation may be intermittently performed by the application processing using memory implemented by the high capacity DIMM. When a plurality of DIMMs are used in order to support the high bandwidth memory operation, more memory capacity than required may be applied. To the contrary, the application processing using memory implemented by the HBM may sometimes perform a high capacity memory operation. When a plurality of HBM components are used in order to support the high capacity memory operation, a bandwidth higher than that required is used so that an application executing speed may be reduced.

Therefore, in order to support both the memory capacity and the bandwidth, a heterogeneous memory system implemented by using DIMM and HBM is required.

SUMMARY

The embodiment of the disclosure provide a data processing system and method for accessing a heterogeneous memory system including a processing unit.

According to an aspect of the disclosure, there is provided a system including: a heterogeneous memory system including a memory module and a high bandwidth memory (HBM), the HBM including a processing-in-memory (PIM) circuit and configured to store data; a host processor configured to: execute arithmetic operations of the system, and allocate one or more of the arithmetic operations to the PIM circuit to be executed by the PIM circuit; and a memory controller configured to detect a data array from the memory module or the HBM based on a border index value, wherein the border index indicates a criterion to determine which memory, among the memory module and the HBM, stores the data array required for the one or more of the arithmetic operations, based on the one or more of the arithmetic operations corresponding to a kernel offloaded by the host processor being performed in the PIM circuit of the HBM.

According to another aspect of the disclosure, there is provided a device including: a memory module configured to store first data; a high bandwidth memory (HBM) configured to store second data, the HBM including a plurality of memory dies arranged in a stacked form, and each plurality of memory dies including a processing-in-memory (PIM) circuit configured to perform an arithmetic operation; and a memory controller configured to: detect a data array from the memory module or the HBM based on a border index value that indicates which memory, among the memory module and the HBM, stores the data array required for the arithmetic operation of the PIM circuit, and generate a memory module command set based on a first physical address space corresponding to the memory module or a HBM command set based on a second physical address space corresponding to the HBM in relation to the data array.

According to another aspect of the disclosure, there is provided a method implemented by a system including a heterogeneous memory system including a memory module and high bandwidth memory (HBM) including a processing-in-memory (PIM) circuit, the method including: offloading, by a host processor, a kernel on the heterogeneous memory system, storing, by the memory controller, a border index value that indicates which memory, among the memory module and the HBM, stores a data array to be processed in accordance with execution of a working code of the offloaded kernel, receiving, by the memory controller, information on the offloaded kernel, which comprises an identification number of the data array, a base address of the data array corresponding to the identification number, an index value representing offset from the base address, and a data size, comparing, by the memory controller, the index value of the data array with the border index value, determining, by the memory controller, that the data array is stored in the HBM when the index value is less than the border index value and determining the data array is stored in the memory module when the index value is greater than the border index value, generating, by the memory controller, a memory module command set instructing the PIM circuit of the HBM to execute the working code by using the data array stored in the memory module and generating, by the memory controller, an HBM command set instructing the PIM circuit of the HBM to execute the working code by using the data array stored in the HBM.

According to another aspect of the disclosure, there is provided a device including: a memory storing one or more instructions; and a processor configured to execute the one or more instructions to: receive an index value of a data array corresponding to one or more arithmetic operations; comparing the index value of the data array with a border index value; transmit a first command set corresponding to the one or more arithmetic operations to a high bandwidth memory (HBM) based on the index value being less than the border index value; and transmit a second command set corresponding to the one or more arithmetic operations to a memory module based on the index value being greater than the border index value.

BRIEF DESCRIPTION OF THE DRAWINGS

Embodiments of the disclosure will be more clearly understood from the following detailed description taken in conjunction with the accompanying drawings in which:

FIGS. 5A and 5B are views illustrating command sets used for the heterogeneous memory system of FIG. 1 according to an example embodiment of the disclosure;

DETAILED DESCRIPTION OF THE EMBODIMENTS

Figure 1:
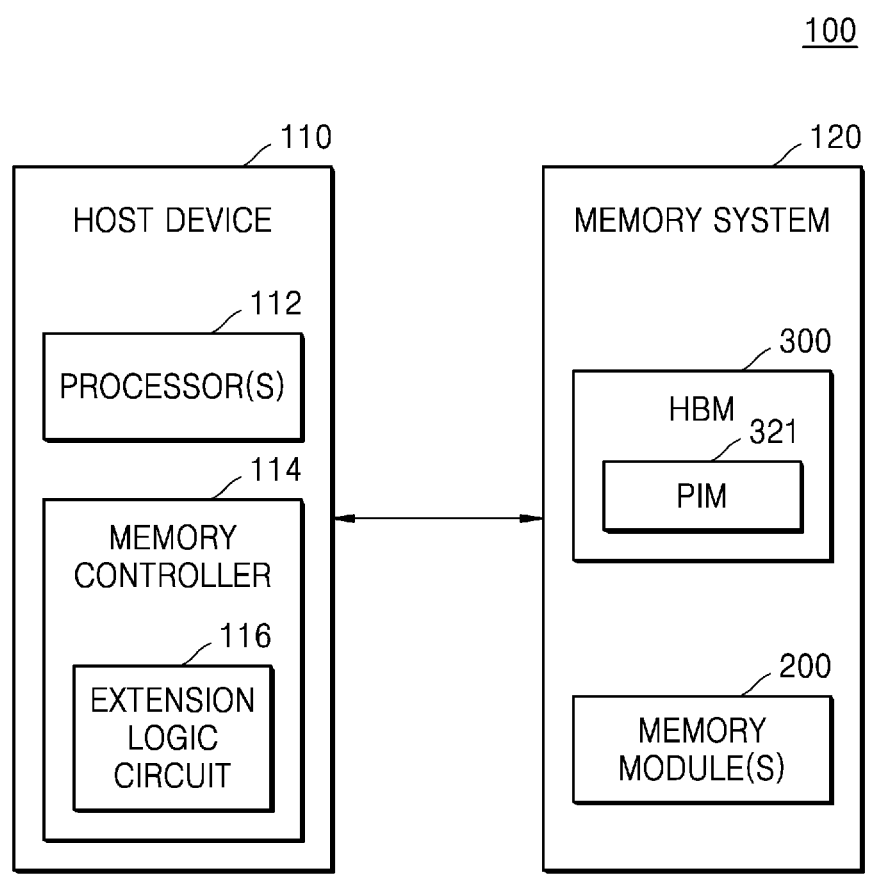
FIG. 1 is a block diagram illustrating a data processing system including a heterogeneous memory system according to an example embodiment of the disclosure.

FIG. 1 is a block diagram illustrating a data processing system 100 including a heterogeneous memory system 120 according to an example embodiment of the disclosure.

Referring to FIG. 1, the data processing system 100 may execute applications such as learning systems high-performance computing applications or a graphic operation application. For instance, the learning systems may deep neural networks or applications for performing machine learning. Such applications require a lot of operation and memory abilities and give importance to power efficiency and low latency in order to cooperatively execute jobs or tasks by a parallel method, to train other data sets, and to learn the other data sets with high accuracy.

The data processing system 100 may include a host device 110 and the heterogeneous memory system 120 including one or more memory modules 200 and high bandwidth memory (HBM) 300. The host device 110 may be used for solving an overall job or task by using parallel processing approach in which the overall job or task is divided into smaller jobs executed in parallel by a large number of computing entities. According to an example embodiment, the computing entities may be processors, cores in the processors, and/or a processing-in-memory (PIM) circuit 321. The task may include a plurality of jobs or tasks configured by a hierarchy and the job or tasks may refer to an executable code to be executed by a computing entity, data to be processed, and data detected from the heterogeneous memory system 120 by the computing entity, manipulated through execution of a code, and to be stored.

The host device 110 may include one or more processors 112 and a memory controller 114. In an example embodiment, an extension logic circuit 116 may be included in the memory controller 114. According to an example embodiment, the one or more processors 112 may function as a primary component of the data processing system 100, and as such, may process and manage commands mainly to execute an operating system (OS) and the applications. In addition, the one or more processors 112 may disperse a complicated job or task into a plurality of computing entities so that job load is processed in parallel. The one or more processors 112 may include a processing unit such as a central processing unit (CPU), a digital signal processor (DSP), a graphics processing unit (GPU), an encryption processing unit, a physics processing unit, or a machine learning processing unit.

The one or more processors 112 may increase efficiency by dispersing or offloading execution of various arithmetic operations, commands, or kernels to another processor or to the heterogeneous memory system 120. The kernel is defined as one or more commands grouped together to perform a task or a definable sub-task. An example, in which the PIM circuit 321 of the HBM 300 performs operation processing by the kernel offloaded by the one or more processors 112, will be described. Various kinds of operation processing may be performed by the PIM circuit 321. For example, in relation to artificial intelligence (AI), at least some of neural network operations may be performed by the PIM circuit 321. For example, the one or more processors 112 may control the HBM 300 through the memory controller 114 so that at least some of the neural network operations may be performed by the PIM circuit 321. In addition, in the following embodiment, it will be described that the extension logic circuit 116 controls the heterogeneous memory system 120 in order to execute the offloaded kernel. However, embodiments of the disclosure are not limited thereto. For example, it may be described that the extension logic circuit 116 is included in the memory controller 114 and the memory controller 114 controls the heterogeneous memory system 120.

The memory controller 114 may include the extension logic circuit 116. The memory controller 114 may include a hardware module, a driver module, and/or a file system module. Here, the module may be in at least one form of hardware, software, a combination of software and hardware or middleware. For example, the extension logic circuit 116 may be a software block loaded on the memory controller 114.

The extension logic circuit 116 may store a border index value determining memory in which a data array required for an arithmetic operation when the PIM circuit 321 of the HBM 300 performs the operation processing by the offloaded kernel is provided. The extension logic circuit 116 may detect the data array from the one or more memory modules 200 or the HBM 300 by using the border index value. In addition, the extension logic circuit 116 may generate a memory module command set and an HBM command set using a physical address space designated in each of the one or more memory modules 200 or the HBM 300 so as not to perform additional address translation on the offloaded kernel.

The heterogeneous memory system 120 may include heterogeneous memory devices including the one or more memory modules 200 and the HBM 300. The one or more memory modules 200 may be connected to the host device 110 through a double data rate (DDR) protocol. The DDR protocol may be a memory standard interface specification of the joint electron device engineering council (JEDEC) standard. The one or more memory modules 200 are connected to the host device 110 in accordance with a DDR interface. However, the disclosure is not limited thereto. The one or more memory modules 200 according to the disclosure may be connected to the host device 110 through various kinds of communication interfaces other than the DDR interface. For example, the communication interface may include industry standard architecture (ISA), peripheral component interconnect express (PCIe), serial advanced technology attachment (SATA), a small computer system interface (SCSI), a serial attached SCSI (SAS), a universal storage bus (USB) attached SCSI (UAS), an Internet small computer system interface (iSCSI), a fiber channel, or fiber channel over Ethernet (FCoE).

The one or more memory modules 200 may be implemented by a dual in-line memory module. The one or more memory modules 200 may include at least one dynamic random access memory (DRAM). Hereinafter, for convenience sake, the one or more memory modules 200 may be mixedly used as dual in-line memory modules (DIMM) 200.

The HBM 300 may be connected to the host device 110 through an HBM protocol of the JEDEC standard. The HBM protocol is a high-performance RAM interface for three-dimensional stacked memory (for example, the DRAM). The HBM 300 consumes a smaller amount of power and has a higher bandwidth in a smaller form factor than other DRAM technologies (for example, DDR4 and GDDR5). The HBM 300 may include the PIM circuit 321 providing computing power.

Figure 2:
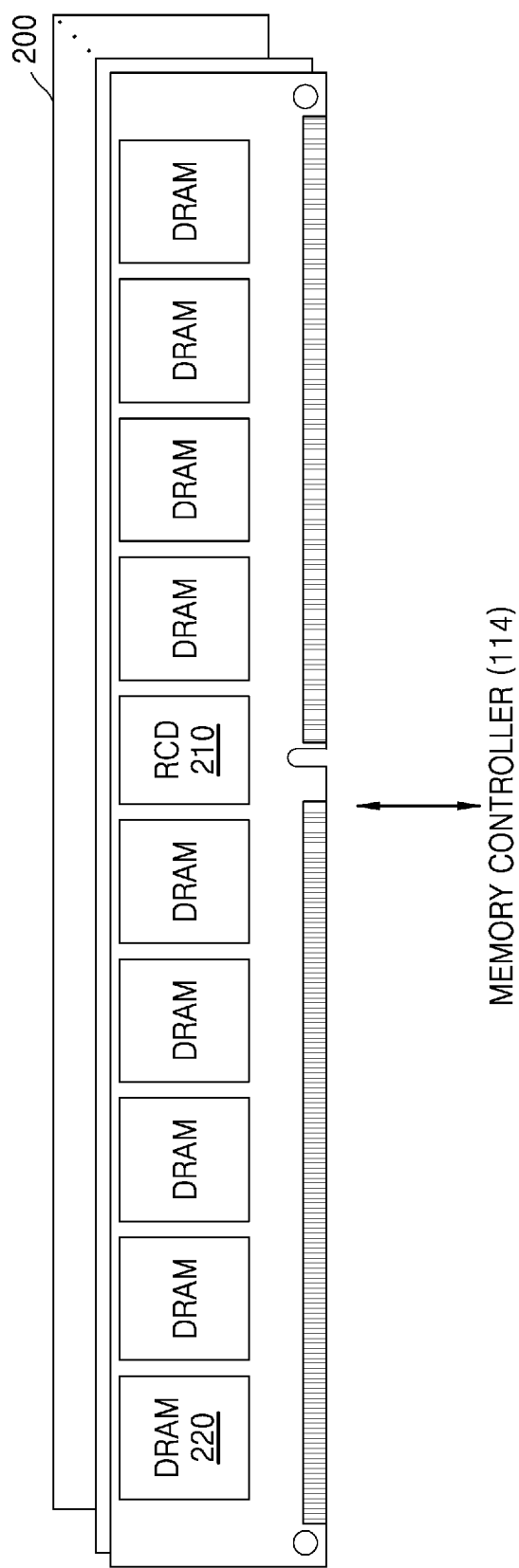
FIG. 2 is a view illustrating a memory module of FIG. 1 according to an example embodiment of the disclosure.

FIG. 2 is a view illustrating the one or more memory modules of FIG. 1.

Referring to FIGS. 1 and 2, the one or more memory modules 200 may include a register clock driver (RCD) 210 and memory devices 220. The memory devices 220 may be DRAM devices. However, the disclosure is not limited thereto and the memory devices 220 may be one of volatile memory devices such as synchronous DRAM (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, DDR4 SDRAM, and DDR5 SDRAM. Hereinafter, for convenience sake, the memory devices 220 are referred to as DRAMs 220.

The RCD 210 may receive a command/an address and data from the host device 110 and may provide a clock signal and command/address signals to the DRAMs 220. The one or more memory modules 200 may be implemented by an arbitrary memory module. For example, the one or more memory modules 200 may be implemented by an unbuffered DIMM (UDIMM), a registered DIMM (RDIMM), a load reduced DIMM (LRDIMM), a fully buffered DIMM (FB-DIMM), or a small outline DIMM (SODIMM).

In order to increase memory capacity, the number of DIMMs 200 mounted in a mother board may be increased. However, the DIMM 200 may be limited to configurations for inputting and outputting data of 16 or 32 bits by the number of connectors mounted in the mother board.

Figure 3:
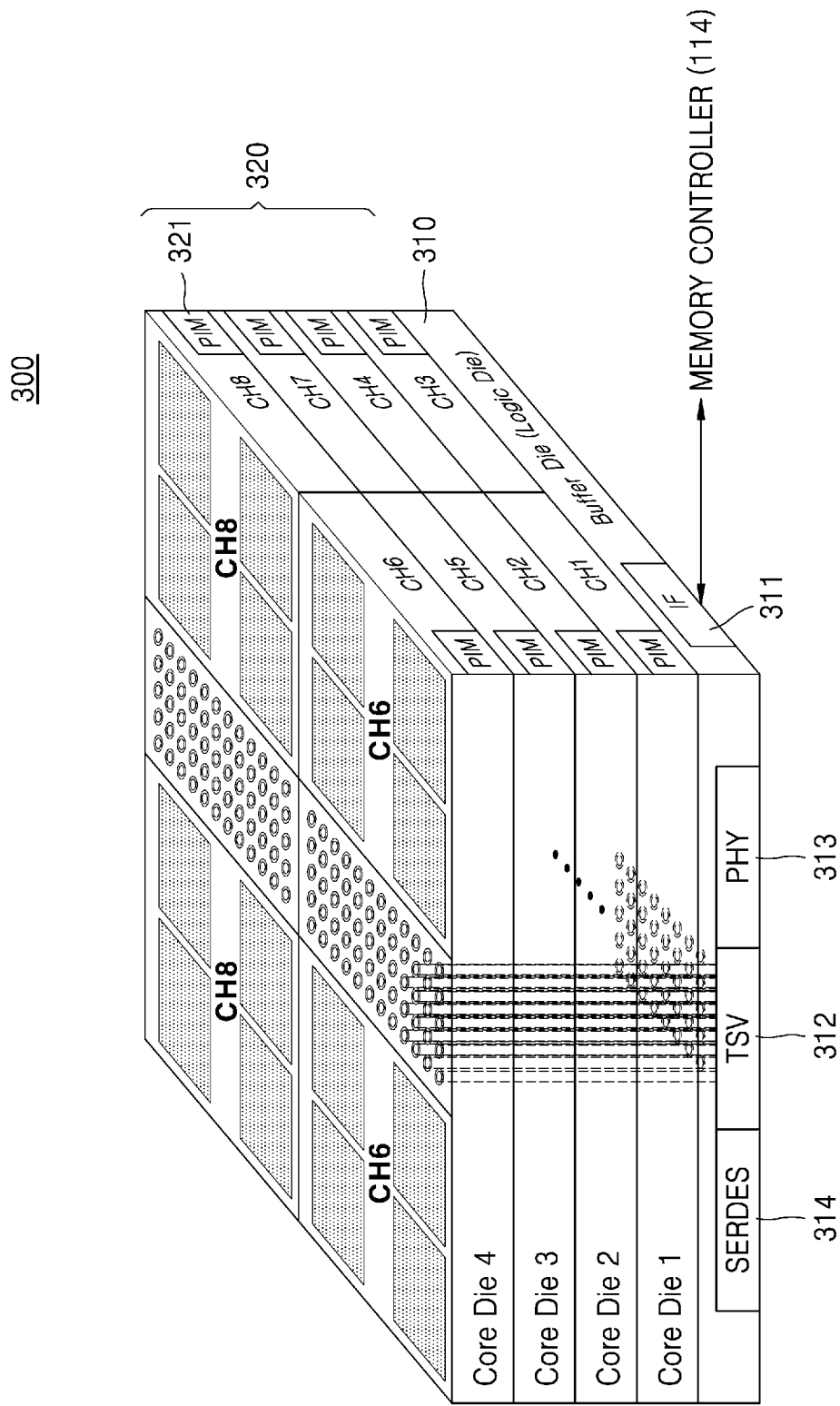
FIG. 3 is a view illustrating high bandwidth memory (HBM) of FIG. 1 according to an example embodiment of the disclosure.

FIG. 3 is a view illustrating the high bandwidth memory (HBM) of FIG. 1.

Referring to FIGS. 1 and 3, the HBM 300 may have a high bandwidth by including first to eighth channels CH1 to CH8 having interfaces independent from one another. The HBM 300 may include a plurality of dies, for example, a buffer die (or a logic die 310) and one or more core dies 320 stacked on the buffer die 310. In the example embodiment of FIG. 3, it is illustrated that the first to fourth core dies 320 are included in the HBM 300. However, the number of core dies 320 may vary according to another example embodiment. The first to fourth core dies 320 may be referred to as memory dies.

Each of the first to fourth core dies 320 may include one or more channels. In FIG. 3, an example, in which each of the first to fourth core dies 320 includes two channels so that the HBM 300 includes the first to eighth channels CH1 to CH8, is illustrated. For example, the first core die may include the first channel CH1 and third channel CH3, the second core die may include the second channel CH2 and fourth channel CH4, the third core die may include the fifth channel CH5 and seventh channel CH7, and the fourth core die may include the sixth channel CH6 and eighth channel CH8.

The buffer die 310 may include an interface circuit 311 communicating with the host device 110 and may receive a command/an address and data from the host device 110 through the interface circuit 311. The host device 110 may transmit the command/the address and the data through buses arranged to correspond to the first to eighth channels CH1 to CH8 and may be formed so that the buses are divided by channel or some buses are shared by at least two channels. The interface circuit 311 may transmit the command/the address and the data to a channel requested by the host device 110 to perform a memory operation or the operation processing. In addition, according to an example embodiment of the disclosure, each of the first to fourth core dies 320 or each of the first to eighth channels CH1 to CH8 may include the PIM circuit 321.

The host device 110 may provide the command/the address and the data so that at least some of a plurality of arithmetic operations or kernels may be performed by the HBM 300 and the operation processing may be performed by the PIM circuit 321 of a channel designated by the host device 110. For example, when the received command/address instructs a channel to perform the operation processing, the PIM circuit 321 of the corresponding channel may perform the operation processing by using the data from the host device 110 and/or data read from the corresponding channel. In another example, when the command/address received to the corresponding channel of the HBM 300 instructs the corresponding channel to perform the memory operation, an access operation to the data may be performed.

According to an example embodiment, each of the first to eighth channels CH1 to CH8 may include a plurality of banks and the PIM circuit 321 of each of the first to eighth channels CH1 to CH8 may include one or more processing elements. For example, in each of the first to eighth channels CH1 to CH8, the number of processing elements may be equal to the number of banks or may be less than the number of banks so that one processing element may be shared by at least two banks. The PIM circuit 321 of each of the first to eighth channels CH1 to CH8 may execute the kernel offloaded by the host device 110.

On the other hand, the buffer die 310 may further include a through silicon via (TSV) area 312, an HBM physical layer interface (HBM PHY) area 313, and a serializer/deserializer (SERDES) area 314. In the TSV area 312, TSVs for communication with the first to fourth core dies 320 are formed. When each of the first to eighth channels CH1 to CH8 has a bandwidth of 128 bits, the TSVs may include configurations for inputting and outputting data of 1,024 bits.

The HBM PHY area 313 may include a plurality of input and output circuits for communication with the host device 110. For example, the HBM PHY area 313 may include one or more ports for communication with the host device 110. The HBM PHY area 313 may include a physical or electrical layer and a logical layer provided for signals, a frequency, timing, driving, a detailed operation parameter, and functionality required for efficient communication between the host device 110 and the HBM 300. The HBM PHY area 313 may perform memory interfacing such as selecting a row and a column corresponding to a memory cell, writing data in the memory cell, or reading the written data. The HBM PHY area 313 may support characteristics of the HBM protocol of the JEDEC standard.

The SERDES area 314 provides an SERDES interface of the JEDEC standard as a processing throughput of the one or more processors 112 of the host device 110 and demands on a memory bandwidth increase. The SERDES area 314 may include an SERDES transmitter, an SERDES receiver, and a controller. The SERDES transmitter may include a parallel-to-serial circuit and a transmitter, may receive a parallel data stream, and may serialize the received parallel data stream. The SERDES receiver may include a receiver amplifier, an equalizer, a clock and data recovery circuit, and a serial-to-parallel circuit, may receive a serial data stream, and may parallelize the received serial data stream. The controller may include registers such as an error detection circuit, an error correction circuit, and a first-in-first-out (FIFO).

Figure 4:
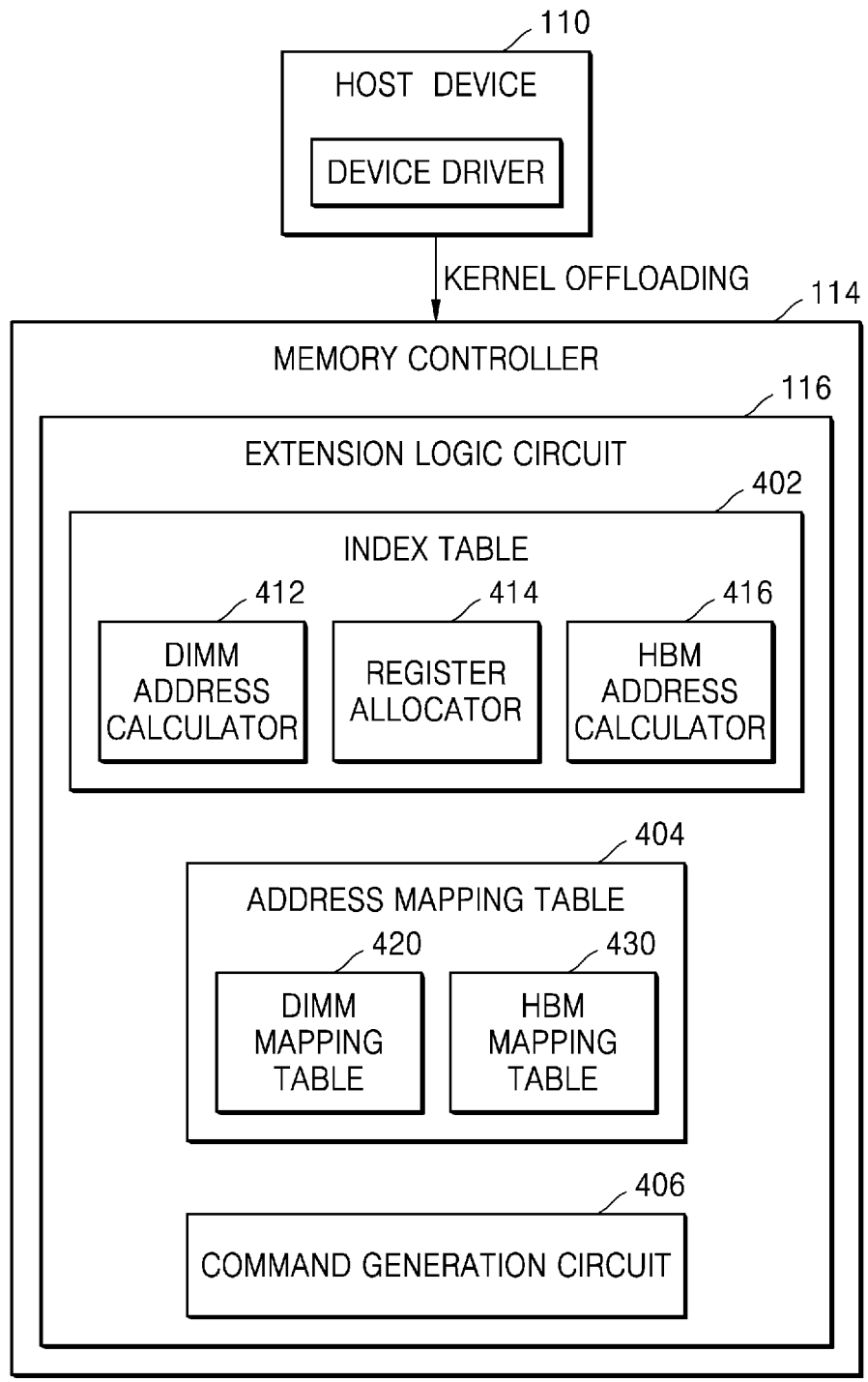
FIG. 4 is a block diagram illustrating a memory controller of FIG. 1 according to an example embodiment of the disclosure.

FIG. 4 is a block diagram illustrating the memory controller 114 of FIG. 1. FIGS. 5A and 5B are views illustrating command sets used for the heterogeneous memory system 120 of FIG. 1.

Referring to FIGS. 1 and 4, the memory controller 114 may include the extension logic circuit 116 configured to perform operations related to a kernel code and/or data by using the heterogeneous memory system 120. For instance, the kernel offloaded through a device driver of the host device 110 may perform operations related to a kernel code and/or data by using the heterogeneous memory system 120. The device driver is utilized in the OS of the host device 110 so as to define and set an interface between the OS and a hardware device of the host device 110. Hereinafter, the extension logic circuit 116 is implemented by hardware, firmware, and software for executing the offloaded kernel or a combination of the hardware, the firmware, and the software.

The extension logic circuit 116 may be configured so that the kernel offloaded by the one or more processors 112 is executed by the PIM circuit 321 of the HBM 300 of the heterogeneous memory system 120. In addition, the extension logic circuit 116 may detect data to be processed in accordance with execution of a working code of the offloaded kernel from the DIMM 200 and/or the HBM 300, may rearrange the data manipulated through the execution of the working code of the offloaded kernel, and may allot the rearranged data to the DIMM 200 and/or the HBM 300.

The offloaded kernel may be performed on the data array. The data array refers to a data structure in the form of an array and may utilize a data structure in an arrangement form in programming languages. For example, the data structure may be an array, a set, a map, or a deque. For example, in graphics processing and an AI application, user access to data tends to be biased toward specific data. Such biased preference has consistency and continuity so that data utilization may be predicted. The extension logic circuit 116 may rearrange the heterogeneous memory system 120 in accordance with a utilization frequency of the data array. Exemplarily, the extension logic circuit 116 may perform a rearrangement so that a data array of small capacity having a high utilization frequency is allotted to the HBM 300 and a data array of large capacity having a low utilization frequency is allotted to the DIMM 200. As the data array is continuously allotted to the DIMM 200 and/or the HBM 300 by the extension logic circuit 116, data management and address translation processes may be simplified.

The extension logic circuit 116 may include an index table logic circuit 402, an address mapping table logic circuit 404, and a command generation circuit 406. The index table logic circuit 402 may include a DIMM address calculator 412, a register locator 414 and an HBM address calculator 416. The index table logic circuit 402 may store a border index value dividing the utilization frequency of the data array. For example, the border index value may be set based on a number of actual utilization and a number of predicted utilization for a specific data array while a particular application is executed. For example, the particular application may be a graphics processing application or an AI application. The border index value may be set as a first value calculated by a ratio of the number of actual utilization to the number of predicted utilization. In another example, the border index value may be set based on a bandwidth of the HBM 300 and a bandwidth of the DIMM 200. The border index value may be set as a second value (for example, about 4 to 6) calculated by a ratio of the bandwidth (for example, about 1,024 GB/sec) of the HBM 300 to the bandwidth (for example, about 24 GB/sec) of the DIMM 200. In another example, the border index value may be set so that the first value calculated by the ratio of the number of actual utilization to the number of predicted utilization is equal to the second value calculated by the ratio of the bandwidth of the HBM 300 to the bandwidth of the DIMM 200.

The index table logic circuit 402 may include information on the offloaded kernel. The information on the offloaded kernel may include an identification number of a data array related to the offloaded kernel, a base address for the data array corresponding to the identification number, an index value, and/or a data size. The base address represents a first physical address of the DIMM 200 or the HBM 300 in which the corresponding data array is stored and the index value represents an offset from the base address. The index table logic circuit 402 may determine that the corresponding data array is stored in the HBM 300 when the received index value is less than the border index value and may determine that the corresponding data array is stored in the DIMM 200 when the received index value is greater than the border index value. The index table logic circuit 402 may be configured so that an address translation operation of calculating the physical address of the corresponding data array based on the base address and the index value is performed.

The address mapping table logic circuit 404 may include a DIMM mapping table 420 and an HBM mapping table 430. The mapping tables may be implemented by registers (or storage units) storing a correlation between the data array corresponding to the identification number and the base address. The DIMM mapping table 420 may store the base address of the corresponding data array for the DIMM 200 and the HBM mapping table 430 may store the base address of the corresponding data array for the HBM 300.

The extension logic circuit 116 may calculate the physical address space of the corresponding data array by using the index table logic circuit 402 and the address mapping table logic circuit 404. The extension logic circuit 116 may determine whether the corresponding data array is stored in the HBM 300 or the DIMM 200 by using an index comparator comparing the border index value with the received index value.

According to an example embodiment, the extension logic circuit 116 may determine that the corresponding data array is stored in the HBM 300 when the received index value is less than the border index value. The extension logic circuit 116 may determine that the corresponding data array is stored in a first address corresponding to a position apart from the base address of the HBM 300, which is stored in the HBM mapping table 430, by the index value by using an HBM address calculator 416. That is, the first address may be calculated by adding the base address with the index value (i.e., the base address+the index value). The HBM address calculator 416 may determine that the corresponding data array is stored in the physical address space from the first address to a second address obtained by multiplying the first address by a data size, which is designed in the HBM 300. That is, the second address may be calculated by adding the base address to the index value, and multiplying the added result by the data size (i.e., (the base address+the index value)*the data size).

According to an example embodiment, the extension logic circuit 116 may determine that the corresponding data array is stored in the DIMM 200 when the received index value is greater than the border index value. The extension logic circuit 116 may determine that the corresponding data array is stored in a third address corresponding to a position apart from the base address of the DIMM 200 of the DIMM mapping table 420 by a value obtained by subtracting the border index value from the received index value by using the address calculator 412. That is, the third address may be calculated by adding the base address to a result from subtracting the index value from the border value (i.e., the base address+(the index value−the border index value)). The DIMM address calculator 412 may determine that the corresponding data array is stored in the physical address space from the third address to a fourth address obtained by multiplying the third address by the data size, which is designed in the DIMM 200. That is, the fourth address may be calculated by adding the base address to a subtracted result from subtracting the index value from the border value, and multiplying the added result by the data size (i.e., (the base address+(the index value−the border index value) *the data size).

The offloaded kernel may be executed by the PIM circuit 321 of the HBM 300. The PIM circuit 321 may directly access the HBM 300 and may receive data when the data array in accordance with the kernel code is stored in the HBM 300. When the data array in accordance with the kernel code is stored in the DIMM 200, the PIM circuit 321 may not directly access the DIMM 200 because there is no interface directly connected to the DIMM 200. Therefore, the PIM circuit 321 may receive the data of the DIMM 200 through the memory controller 114.

When it is determined by the extension logic circuit 116 that the corresponding data array is stored in the HBM 300, the command generation circuit 406 may generate a command set 530 for the HBM 300, in which the address of the HBM 300 may be used as an operand. The command set 530 for the HBM 300 may include an opcode parameter, a vector size parameter, a source parameter, and a destination parameter as illustrated in FIG. 5A.

The opcode parameter may be displayed the same as commands of the offloaded kernel. The commands of the offloaded kernel may include x86 and RISC-V and the opcode parameter may be set for each of the commands. The vector size parameter represents a correlation between the number of data inputs and outputs of a DRAM cache line in the host device 110 and the number of data inputs and outputs of the data array. For example, when the DRAM cache line is 64 bytes (B) and the data array is 256 bytes (B), the vector size parameter may be set as 4. That is, it may be displayed the same as bringing four 64B DRAM cache lines. The source parameter may represent a source address by which the data array is brought and may be displayed by the address of the HBM 300. The destination parameter may display an identification number of a register storing an intermediate result value when the PIM circuit 321 of the HBM 300 performs the operation processing. For example, the register may be included in the memory controller 114 and may be displayed as 4 when the register is a fourth register.

When it is determined by the extension logic circuit 116 that the corresponding data array is stored in the DIMM 200, the command generation circuit 406 may generate a command set 520 for the DIMM 200. The command set 520 for the DIMM 200 may include an opcode parameter, a vector size parameter, a vector position parameter, an immediate value parameter, and a destination parameter as illustrated in FIG. 5B.

The opcode parameter may be displayed the same as commands of the offloaded kernel. The commands of the offloaded kernel may include x86 and RISC-V and the opcode parameter may be set for each of the commands. The vector size parameter represents a correlation between the number of data inputs and outputs of a DRAM cache line in the host device 110 and the number of data inputs and outputs of the data array. For example, when the DRAM cache line is 64 B and the data array is 256 B, the vector size parameter may be set as 4. That is, it may be displayed the same as bringing four 64 B DRAM cache lines. The vector position parameter may display a position of 64 B data utilized in the current command. For example, when second data corresponding to 64 B-128 B is brought from the 256 B data array, the vector position parameter may be displayed as 2. The immediate value parameter may store a data value by 64 B DRAM cache line brought from the DIMM 200. The destination parameter may display an identification number of a register storing an intermediate result value when the operation processing is performed by using data brought from the DIMM 200. For example, the register may be included in the memory controller 114 and may be displayed as 4 when the register is a fourth register.

In the command set 530 for the HBM 300 and the command set 520 for the DIMM 200, which are described in FIGS. 5A and 5B, in order to allocate a register related to the destination parameter, the extension logic circuit 116 may further include a register allocator 414. The register allocator 414 may be implemented by a logic circuit including an SRAM table capable of determining whether a register is occupied. The register allocator 414 may display which register is allocated to a processing operation and which register is not currently utilized.

Figure 6:
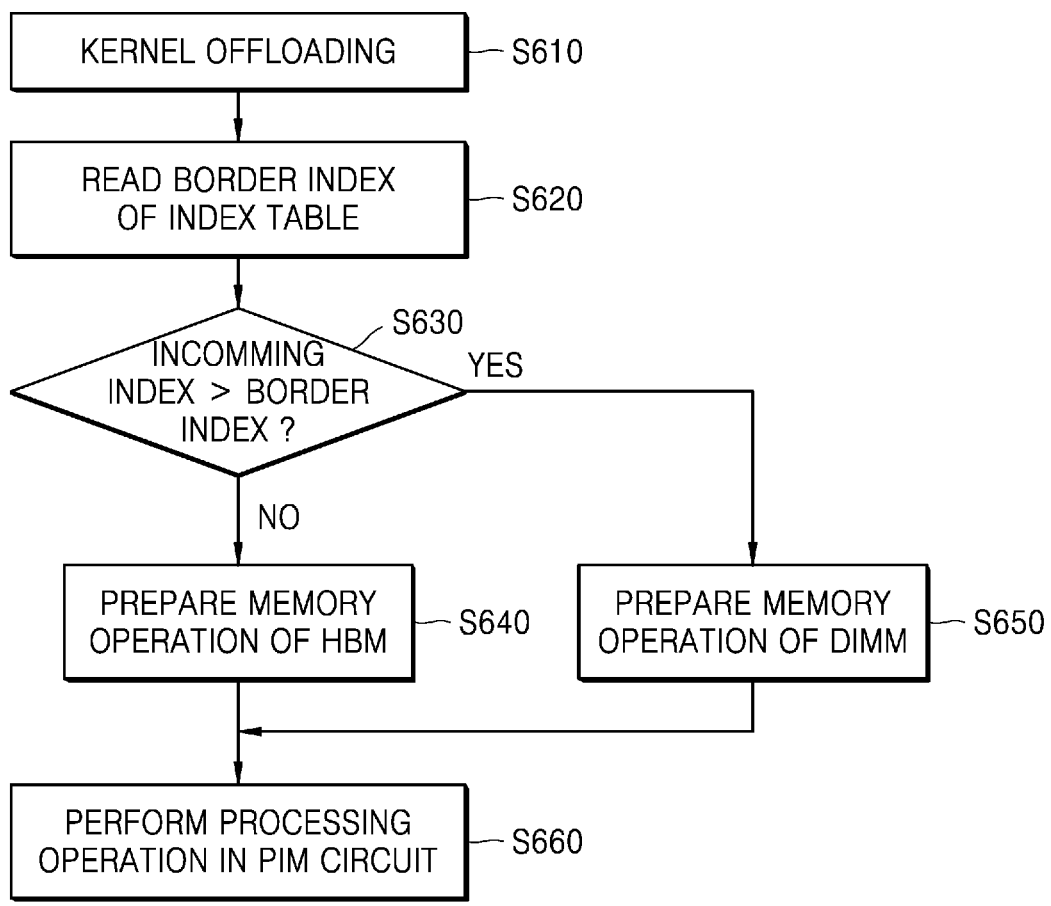
FIGS. 6, 7 and 8 are flow diagrams illustrating an operation of the memory controller of FIG. 4 according to an example embodiment of the disclosure.
Figure 7:
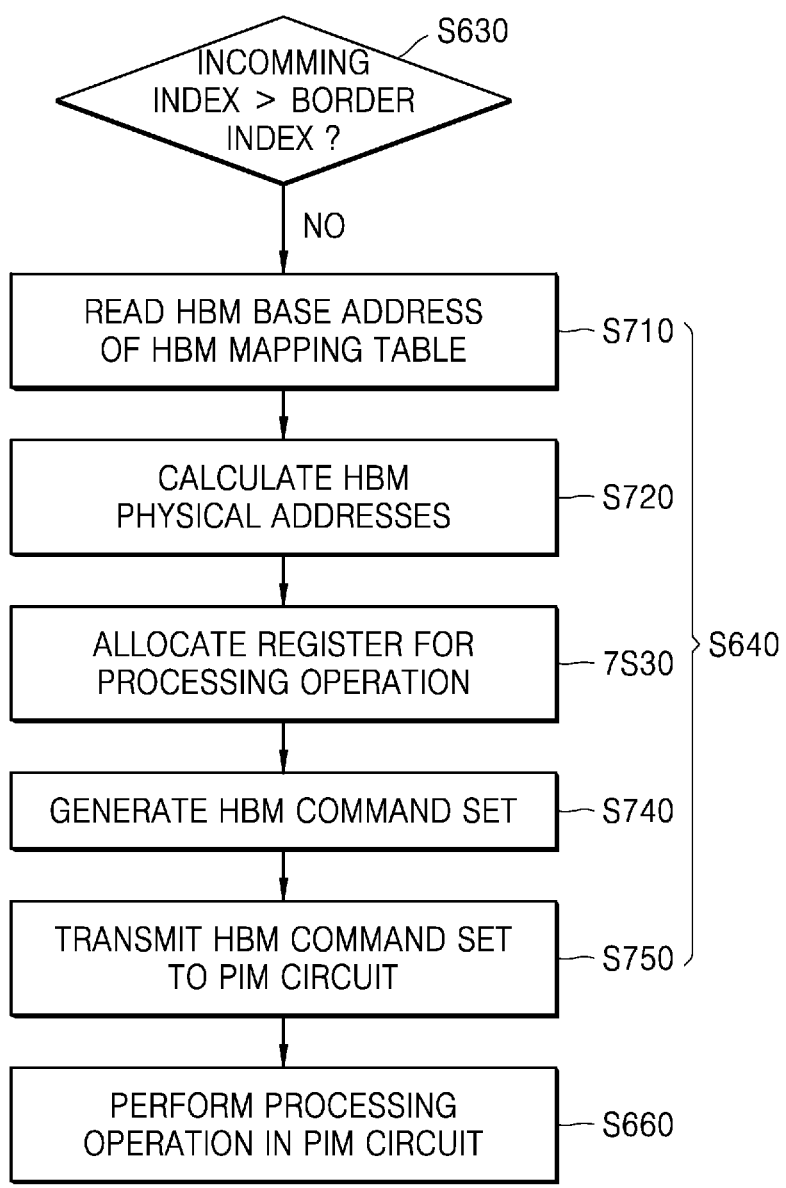
Figure 8:
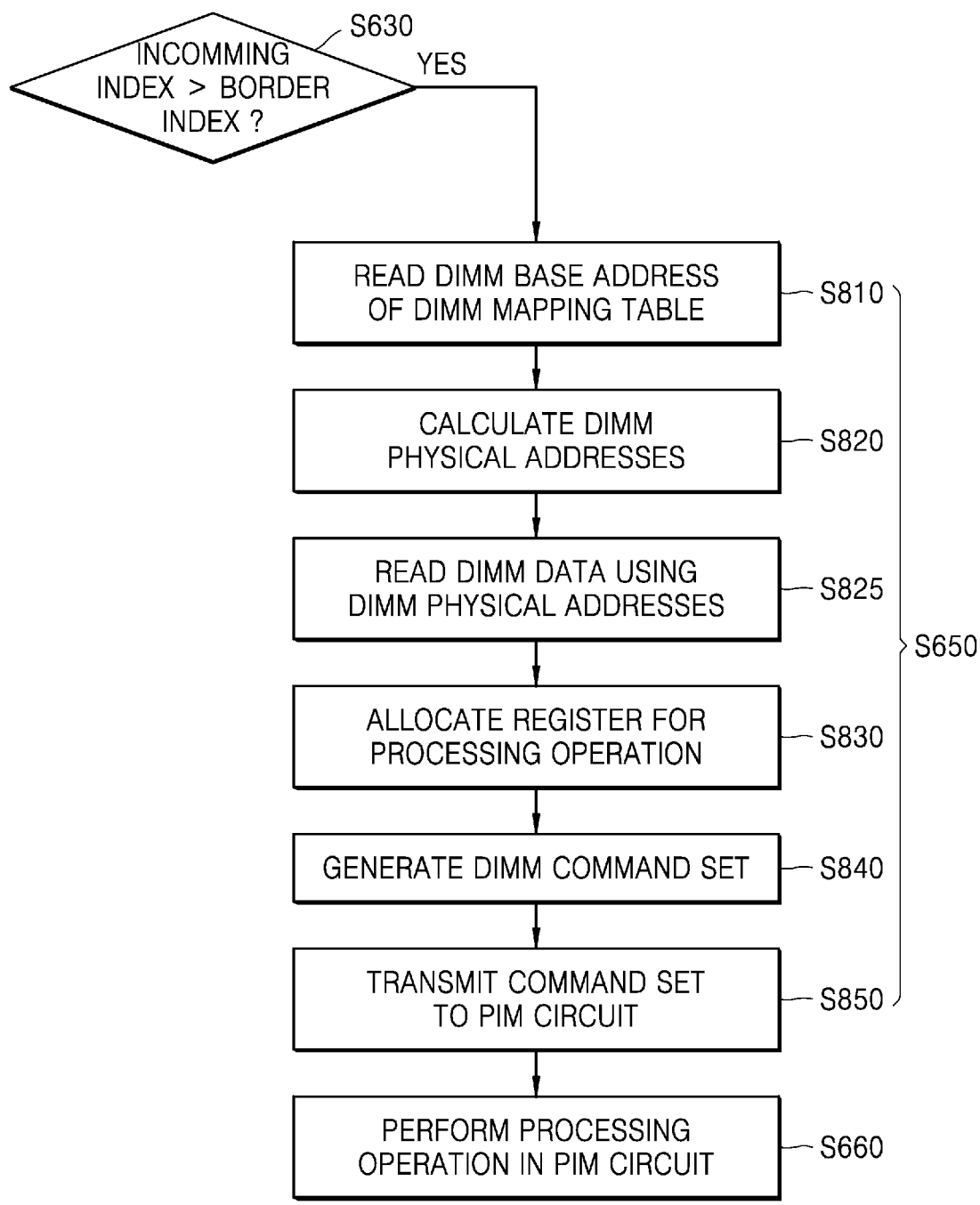

FIGS. 6, 7 and 8 are flow diagrams illustrating an operation of the memory controller 114 of FIG. 4.

Referring to FIGS. 1 to 6, in operation S610, the one or more processors 112 of the host device 110 may disperse or offload execution of kernels to another processor or on the heterogeneous memory system 120 in order to increase efficiency of the arithmetic operation. The one or more processors 112 may provide information on the offloaded kernel, for example, the identification number of the data array, the base address for the data array corresponding to the identification number, the index value, and/or the data size to the memory controller 114 through the device driver. The memory controller 114 may control the kernel offloaded by the one or more processors 112 to perform the operation processing in the PIM circuit 321 of the HBM 300.

In operation S620, the memory controller 114 may read the border index value stored in the index table logic circuit 402. The border index value may be set as a base on which memory in which the data array related to the offloaded kernel is stored is determined. In the example embodiment, it is described that the border index value is set based on a utilization frequency ratio of the data array related to the offloaded kernel and a bandwidth ratio between the DIMM 200 and the HBM 300. However, according to an example embodiment, the border index value may be set by using another information item on the offloaded kernel.

In operation S630, the memory controller 114 may determine in which memory the corresponding data array is stored by comparing the index value received in operation S610 with the border index value. The memory controller 114 may proceed to operation S650 when the received index value is greater than the border index value (YES) and may proceed to operation S640 when the received index value is less than the border index value (NO). In operation S640, the memory controller 114 may determine that the corresponding data array is stored in the HBM 300 and may perform a memory operation on the HBM 300. In operation S650, the memory controller 114 may determine that the corresponding data array is stored in the DIMM 200 and may perform a memory operation on the DIMM 200.

Referring to FIG. 7, when it is determined that the corresponding data array is stored in the HBM 300 as a result of comparison of operation S630, the memory controller 114 may perform the memory operation on the HBM 300 in operation S640 including operation S710 to operation S750. In operation S710, the memory controller 114 may read the base address of the HBM 300, which is stored in the HBM mapping table 430 and corresponds to the base address for the data array of the offloaded kernel received in operation S610.

In operation S720, the memory controller 114 may calculate the physical addresses of the HBM 300 in which the data array is stored. The memory controller 114 may calculate the first address corresponding to the position apart from the base address of the HBM 300 by the index value. That is, the first address may be calculated by adding the base address to the index value (i.e., the base address+the index value). Then, the memory controller 114 may calculate the second address corresponding to the value obtained by multiplying the first address by the data size. That is, the second address may be calculated by adding the base address to the index value, and multiplying the added result by the data size (i.e., (the base address+the index value)*the data size). The memory controller 114 may determine that the data array of the offloaded kernel is stored in the physical address space from the first address to the second address of the HBM 300.

In operation S730, the memory controller 114 may allocate the register storing the intermediate result value when the operation processing is performed by the PIM circuit 321 of the HBM 300 in accordance with the offloaded kernel, which is related to the destination parameter included in the HBM command set 530.

In operation S740, the memory controller 114 may generate the command set 530 for the HBM 300. The command set 530 for the HBM 300 may include the opcode parameter, the vector size parameter, the source parameter, and the destination parameter as illustrated in FIG. 5A. The opcode parameter may be displayed the same as the commands of the offloaded kernel. The vector size parameter may represent the correlation between the number of data inputs and outputs of the DRAM cache line in the host device 110 and the number of data inputs and outputs of the data array. The source parameter may be displayed by the address of the HBM 300, by which the data array is brought. The destination parameter may display the identification number of the register allocated in operation S730.

In operation S750, the memory controller 114 may transmit the command set 530 for the HBM 300, which is generated in operation S740, to the PIM circuit 321 of the HBM 300. Then, the PIM circuit 321 of the HBM 300 performs the operation processing in accordance with the command set 530 for the HBM 300 in operation S660.

When it is determined that the corresponding data array is stored in the DIMM 200 as a result of comparison of operation S630, as illustrated in FIG. 8, the memory controller 114 may perform the memory operation on the DIMM 200 in operation S650 including operation S810 to operation S850. In operation S810, the memory controller 114 may read the base address of the DIMM 200, which is stored in the DIMM mapping table 420 and corresponds to the base address for the data array of the offloaded kernel received in operation S610.

In operation S820, the memory controller 114 may calculate the physical addresses of the DIMM 200 in which the data array is stored. The memory controller 114 may calculate the third address corresponding to the position apart from the base address of the DIMM 200 of the DIMM mapping table 420 by the value obtained by subtracting the border index value from the index value. That is, the third address may be calculated by adding the base address to a result from subtracting the index value from the border value (i.e., the base address+(the index value−the border index value)). Then, the memory controller 114 may calculate a fourth address obtained by multiplying the third address by the data size. That is, the fourth address may be calculated by adding the base address to a subtracted result from subtracting the index value from the border value, and multiplying the added result by the data size (i.e., (the base address+(the index value−the border index value)*the data size). The memory controller 114 may determine that the data array of the offloaded kernel is stored in the physical address space from the third address to the fourth address of the DIMM 200.

In operation S825, the memory controller 114 may read the data array stored in the DIMM 200 by using the physical addresses of the DIMM 200, which are calculated in operation S820, which is for providing the data of the DIMM 200 to the PIM circuit 321 through the memory controller 114 because there is no interface directly connected to the DIMM 200 so that the PIM circuit 321 of the HBM 300 may not directly access the DIMM 200.

In operation S830, the memory controller 114 may allocate the register storing the intermediate result value when the operation processing is performed by the PIM circuit 321 of the HBM 300 in accordance with the offloaded kernel, which is related to the destination parameter included in the DIMM command set 520.

In operation S840, the memory controller 114 may generate the command set 520 for the DIMM 200. The command set 520 for the DIMM 200 may include the opcode parameter, the vector size parameter, the vector position parameter, the immediate value parameter, and the destination parameter as illustrated in FIG. 5B. The opcode parameter may be displayed the same as the commands of the offloaded kernel. The vector size parameter may represent the correlation between the number of data inputs and outputs of the DRAM cache line in the host device 110 and the number of data inputs and outputs of the data array. The vector position parameter may display the position of the 64B data utilized in the current command in the 256B data array. The immediate value parameter may represent the data value by the 64B DRAM cache line brought from the DIMM 200. The destination parameter may display the identification number of the register allotted in operation S830.

In operation S850, the memory controller 114 may transmit the command set 520 for the DIMM 200, which is generated in operation S840, to the PIM circuit 321 of the HBM 300. Then, the PIM circuit 321 of the HBM 300 performs the operation processing in accordance with the command set 520 for the DIMM 200 in operation S660.

Figure 9:
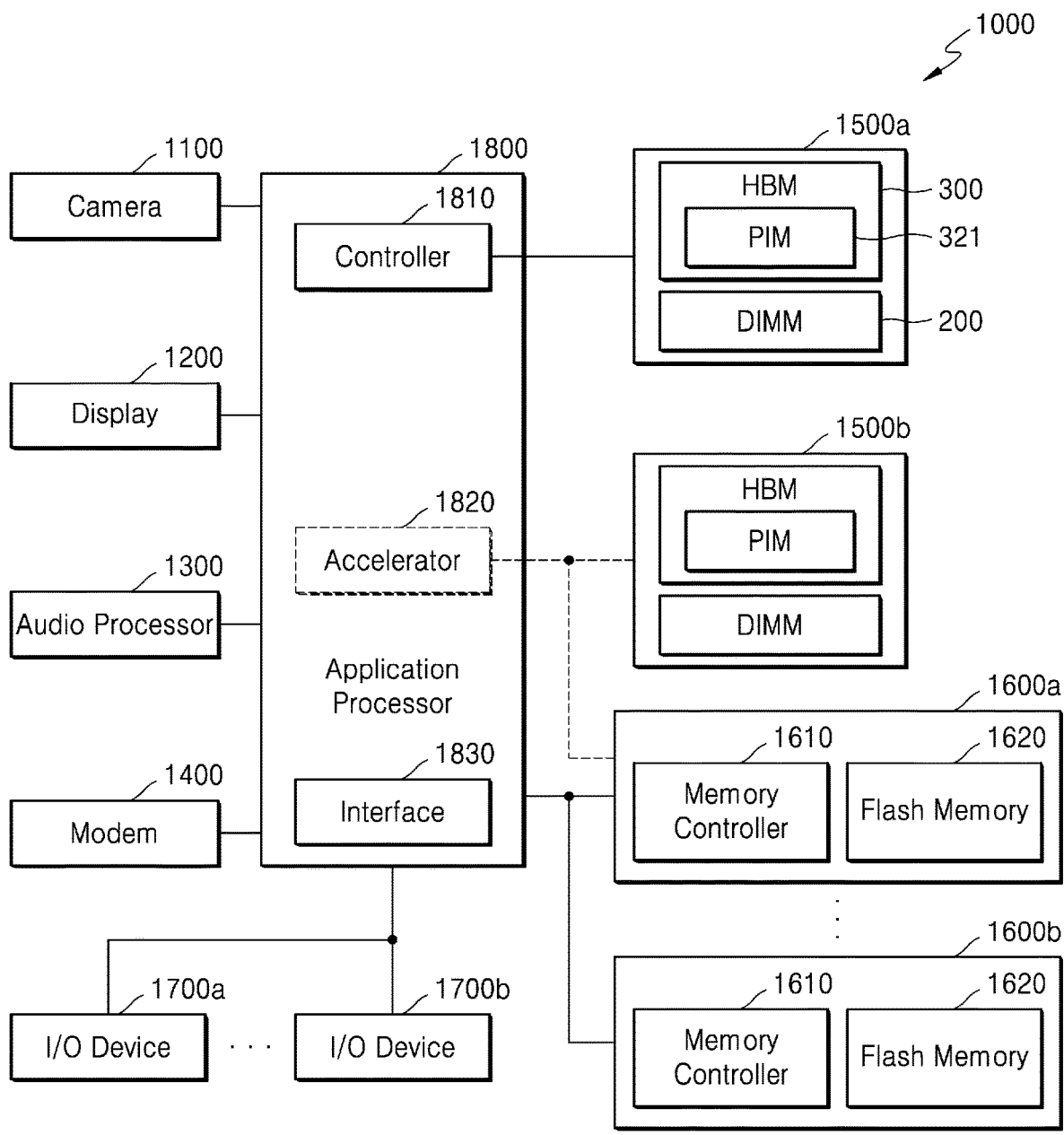
FIG. 9 is a block diagram illustrating a system including a heterogeneous memory system according to an example embodiment of the disclosure.

FIG. 9 is a block diagram illustrating a system 1000 including a heterogeneous memory system according to an example embodiment of the disclosure.

Referring to FIG. 9, the system 1000 may include a camera 1100, a display 1200, an audio processor 1300, a modem 1400, DRAM devices 1500a and 1500b, flash memory devices 1600a and 1600b, input/output (I/O) devices 1700a and 1700b, and an application processor (hereinafter, referred to as "AP") 1800. The system 1000 may be implemented by a laptop computer, a mobile phone, a smartphone, a tablet personal computer (PC), a wearable device, a healthcare device, or an Internet of things (JOT) device. In addition, the system 1000 may be implemented by a server or a PC.

The camera 1100 may capture a still image or a moving picture in accordance with control of a user and may store the captured image/image data or may transmit the captured image/image data to the display 1200. The audio processor 1300 may process audio data included in the flash memory devices 1600a and 1600b or contents of a network. The modem 1400 may modulate and transmit a signal in order to transmit and receive wired/wireless data and may demodulate the modulated signal in order to recover the modulated signal to an original signal in a receiving side. The I/O devices 1700a and 1700b may include devices providing digital input and/or output functions such as a universal serial bus (USB) or a storage, a digital camera, a secure digital (SD) card, a digital versatile disc (DVD), a network adapter, and a touch screen.

The AP 1800 may control an overall operation of the system 1000. The AP 1800 may control the display 1200 so that some of the contents stored in the flash memory devices 1600a and 1600b are displayed on the display 1200. When a user input is received through the I/O devices 1700a and 1700b, the AP 1800 may perform a control operation corresponding to the user input. The AP 1800 may include an accelerator block that is a dedicated circuit for data operation or an accelerator chip 1820 apart from the AP 1800. The DRAM device 1500b may be additionally mounted in the accelerator block or the accelerator chip 1820. The accelerator block as a function block professionally performing a specific function of the AP 1800 may include the GPU as a function block professionally performing graphics data processing, a neural processing unit (NPU) as a block professionally performing AI calculation and inference, and a data processing unit (DPU) as a block professionally performing data transmission.

The system 1000 may include the DRAM devices 1500a and 1500b. The AP 1800 may control the DRAM devices 1500a and 1500b by setting a command and a mode register MRS suitable for the JEDEC standard or may perform communication by setting a DRAM interface code in order to use company-specific functions such as a low voltage/a high speed/reliability and cyclic redundancy check (CRC)/error correction code (ECC) functions. For example, the AP 1800 may communicate with the DRAM device 1500a by an interface suitable for the JEDEC standard such as LPDDR4 or LPDDR5 and the accelerator block or the accelerator chip 1820 may perform communication by setting a new DRAM interface code in order to control the DRAM device 1500b for an accelerator having a higher bandwidth than that of the DRAM device 1500a.

In FIG. 9, only the DRAM devices 1500a and 1500b are illustrated. However, the disclosure is not limited thereto and any memory such as phase-change RAM (PRAM), SRAM, magnetoresistive RAM (MRAM), resistive RAM (RRAM), ferroelectric RAM (FRAM), or hybrid RAM may be used if only a bandwidth, a reaction speed, and voltage conditions of the AP 1800 or the accelerator chip 1820 are satisfied. The DRAM devices 1500a and 1500b have latencies and bandwidths lower than those of the I/O devices 1700a and 1700b or the flash memory devices 1600a and 1600b. The DRAM devices 1500a and 1500b may be initialized at a power on point in time of the system 1000 and may have the OS and application data loaded thereon so as to be used as an arbitrary storage of the OS and the application data or an execution space of various software codes.

In the DRAM devices 1500a and 1500b, an addition operation, a subtraction operation, a multiplication operation, a division operation, a vector operation, an address operation, or a fast Fourier transform (FFT) operation may be performed. In addition, in the DRAM devices 1500a and 1500b, a function used for inference may be performed. Here, the inference may be performed in a deep learning algorithm using an artificial neural network. The deep learning algorithm may include training operation of learning a model through various data items and inference operation of recognizing data by the learned model. In an example embodiment, the image captured by a user through the camera 1100 may be signal processed and stored in the DRAM device 1500b and the accelerator block or the accelerator chip 1820 may perform the AI data operation of recognizing data by using the data stored in the DRAM device 1500b and the function used for the inference.

In the system 1000, the DRAM devices 1500a and 1500b may be implemented by the heterogeneous memory system including the DIMM 200 and the HBM 300 including the PIM circuit 321, which is described with reference to FIGS. 1 to 8. The DRAM devices 1500a and 1500b may perform the arithmetic operation in accordance with the offloaded kernel in the AP 1800. When the arithmetic operation is performed by the PIM circuit 321 of the HBM 300, a memory controller 1810 may detect the data array from the DIMM 200 or the HBM 300 by using the border index value based on which the memory in which the data array required for the arithmetic operation is stored is determined. In addition, the memory controller 1810 may generate a DIMM command set and an HBM command set using physical address spaces respectively designated in the DIMM 200 and the HBM 300 so that additional address translation is not performed on the offloaded kernel.

The system 1000 may include a plurality of storages or the flash memory devices 1600a and 1600b having capacity greater than that of the DRAM devices 1500a and 1500b. The accelerator block or the accelerator chip 1820 may perform training operation and inference AI data operation by using the flash memory devices 1600a and 1600b For example, the flash memory devices 1600a and 1600b may efficiently perform the training operation and the inference AI data operation performed by the AP 1800 and/or the accelerator chip 1820 by using an operation device included in a memory controller 1610. The flash memory devices 1600a and 1600b may store a photograph taken by the camera 1100 or data received through a data network. For example, the flash memory devices 1600a and 1600b may store augmented reality (AR)/virtual reality (VR) and high definition (HD) or ultrahigh definition (UHD) contents.

Figure 10:
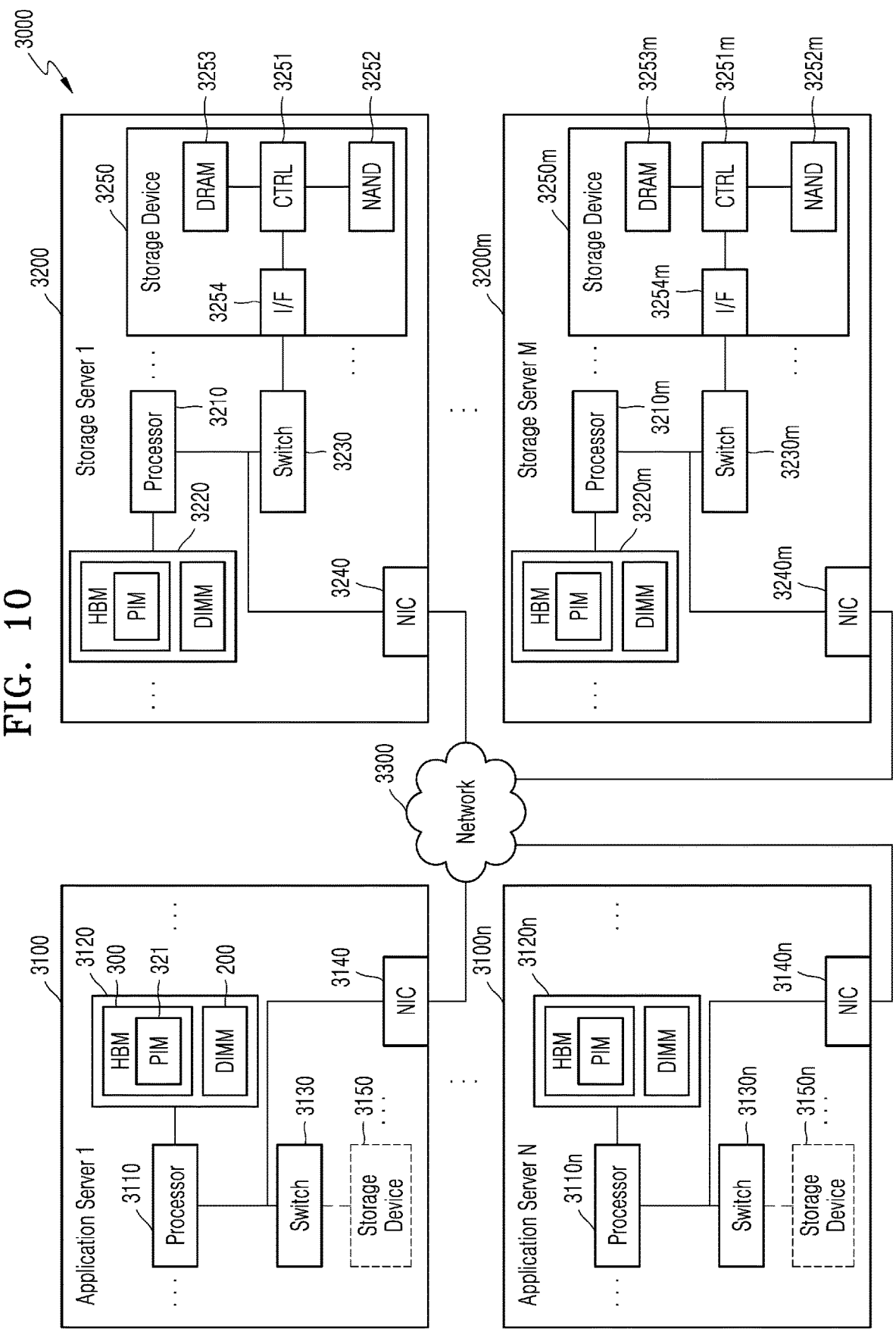
FIG. 10 is a view illustrating a data center to which a heterogeneous memory system according to an example embodiment of the disclosure is applied.

FIG. 10 is a view illustrating a data center 3000 to which a heterogeneous memory system according to an example embodiment of the disclosure is applied.

Referring to FIG. 10, the data center 3000 as a facility gathering various data items and providing a service may be referred to as a data storage center. The data center 3000 may be a system for operating a search engine and a data base or a computing system used for a company such as a bank or a government agency. The data center 3000 may include application servers 3100 to 3100n and storage servers 3200 to 3200m. The number of application servers 3100 to 3100n and the number of storage servers 3200 to 3200m may vary according to an example embodiment and the number of application servers 3100 to 3100n may be different from the number of storage servers 3200 to 3200m.

The application server 3100 or the storage server 3200 may include at least one of processors 3110 and 3210 and memory devices 3120 and 3220. When description is given taking the storage server 3200 as an example, the processor 3210 may control an overall operation of the storage server 3200, may access the memory 3220, and may execute a command and/or data loaded on the access the memory 3220. The memory 3220 may include DDR SDRAM, HBM, a hybrid memory cube (HMC), a DIMM, an Optane DIMM, or a non-volatile DIMM (NVMDIMM). According to an example embodiment, the number of processors 3210 included in the storage server 3200 and the number of memory devices 3220 included in the storage server 3200 may vary. In an example embodiment, the processor 3210 and the memory 3220 may provide a processor-memory pair. In an example embodiment, the number of processors 3210 may be different from the number of memory devices 3220. The processor 3210 may include a single core processor or a multicore processor. The above description of the storage server 3200 may also be similarly applied to the application server 3100. According to an example embodiment, the application server 3100 may not include a storage device 3150. The storage server 3200 may include at least one storage device 3250. The number of storage devices 3250 included in the storage server 3200 may vary according to an example embodiment.

In the application server 3100 or the storage server 3200, the memory devices 3120 and 3220 may be implemented by the heterogeneous memory system including the DIMM 200 and the HBM 300 including the PIM circuit 321, which is described with reference to FIGS. 1 to 8. The memory devices 3120 and 3220 may be combined with the memory controller controlling the processors 3110 and 3210 to perform the arithmetic operation in accordance with the offloaded kernel. When the arithmetic operation is performed by the PIM circuit 321 of the HBM 300, the memory controller may detect the data array from the DIMM 200 or the HBM 300 by using the border index value based on which the memory in which the data array required for the arithmetic operation is stored is determined. In addition, the memory controller may generate the DIMM command set and the HBM command set using the physical address spaces respectively designated in the DIMM 200 and the HBM 300 so that additional address translation is not performed on the offloaded kernel.

The application servers 3100 to 3100n may communicate with the storage servers 3200 to 3200m through a network 3300. The network 3300 may be implemented by using a fiber channel (FC) or Ethernet. At this time, the FC is a medium used for high speed data transmission and an optical switch providing high performance/high availability may be used as the FC. In accordance with an access method of the network 3300, the storage servers 3200 to 3200m may be provided as a file storage, a block storage, or an object storage.

In an example embodiment, the network 3300 may include a storage-only network such as a storage area network (SAN). For example, the SAN may include an FC-SAN implemented in accordance with an FC protocol (FCP) by using an FC network. In another example, the SAN may include an IP-SAN implemented in accordance with SCSI over transmission control protocol (TCP)/IP or Internet SCSI (iSCSI) by using a TCP/IP network. In another example embodiment, the network 3300 may include a common network such as the TCP/IP network. For example, the network 3300 may be implemented in accordance with a protocol such as FC over Ethernet (FCoE), a network attached storage (NAS), or NVMe over fabrics (NVMe-oF).

Hereinafter, description will be given based on the application server 3100 and the storage server 3200. Description of the application server 3100 may also be applied to the application server 3100n and description of the storage server 3200 may also be applied to the storage server 3200m.

The application server 3100 may store data requested by a user or a client to be stored in one of the storage servers 3200 to 3200m through the network 3300. In addition, the application server 3100 may obtain the data requested by a user or a client to be read from one of the storage servers 3200 to 3200m through the network 3300. For example, the application server 3100 may be implemented by a web server or a database management system (DBMS).

The application server 3100 may access a memory device 3120n or a storage device 3150n included in the application server 3100n or may access memory devices 3220 to 3220m or storage devices 3250 to 3250m included in the storage servers 3200 to 3200m through the network 3300. Therefore, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. At this time, the data may move to memory devices 3120 to 3120n of the application servers 3100 to 3100n through the memory devices 3220 to 3220m of the storage servers 3200 to 3200m from the storage devices 3250 to 3250m of the storage servers 3200 to 3200m or may directly move to the memory devices 3120 to 3120n of the application servers 3100 to 3100n. The data moving through the network 3300 may be encrypted for security or privacy.

When description is given taking the storage server 3200 as an example, an interface 3254 may provide physical connection between the processor 3210 and a controller 3251 and physical connection between a network interface card (NIC) 3240 and the controller 3251. For example, the interface 3254 may be implemented by a direct attached storage (DAS) method by which the storage device 3250 directly accesses a dedicated cable. In addition, the interface 3254 may be implemented by one of various interface methods such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an NVM express (NVMe) interface, an IEEE 1394 interface, a universal serial bus (USB) interface, a secure digital (SD) card interface, a multimedia card (MMC) interface, an embedded multimedia card (eMMC) interface, a universal flash storage (UFS) interface, an embedded universal flash storage (eUFS) interface, and a compact flash (CF) card interface.

The storage server 3200 may further include a switch 3230 and the NIC 3240. The switch 3230 may selectively connect the processor 3210 to the storage device 3250 in accordance with control of the processor 3210 or may selectively connect the NIC 3240 to the storage device 3250.

In an example embodiment, the NIC 3240 may include a network interface card and a network adaptor. The NIC 3240 may be connected to the network 3300 by a wired interface, a wireless interface, a Bluetooth interface, or an optical interface. The NIC 3240 may include internal memory, a digital signal processor (DSP), and a host bus interface and may be connected to the processor 3210 and/or the switch 3230 through the host bus interface. The host bus interface may be implemented by one of the above-described example of the interface 3254. In an example embodiment, the interface 3254 may be integrated with at least one of the processor 3210, the switch 3230, and the storage device 3250.

The application servers 3100 to 3100n or the memory devices 3220 to 3220m transmit a command to the storage devices 3150 to 3150n and 3250 to 3250m or the memory devices 3120 to 3120n and 3220 to 3220m so that data may be programmed or read. At this time, the data may be error corrected through an error correction code (ECC) engine. The data may be data bus inversion (DBI) or data masking (DM) processed and may include cyclic redundancy code (CRC) information. The data may be encrypted for security or privacy.

The storage devices 3150 to 3150n and 3250 to 3250m may transmit a control signal and command/address signals to NAND flash memory devices 3252 to 3252m in response to a read command received from the processor. Therefore, when the data is read from the NAND flash memory devices 3252 to 3252m, a read enable (RE) signal may be input as a data output control signal and may output the data to a DQ bus. A data strobe DQS may be generated by using the RE signal. The command/address signals may be latched to a page buffer in accordance with a rising edge or a falling edge of a write enable (WE) signal.

The controller 3251 may control an overall operation of the storage device 3250. In an example embodiment, the controller 3251 may include SRAM. The controller 3251 may write data in the NAND flash memory device 3252 in response to a write command or may read data from the NAND flash memory device 3252 in response to the read command. For example, the write command and/or the read command may be provided by the processor 3210 in the storage server 3200, the processor 3210m in the storage server 3200m, or the processors 3110 and 3110n in the application servers 3100 and 3100n. DRAM 3253 may arbitrarily store (buffer) the data to be written in the NAND flash memory device 3252 or the data read from the NAND flash memory device 3252. In addition, the DRAM 3253 may store metadata. Here, the metadata may include user data or data generated by the controller 3251 in order to manage the NAND flash memory device 3252. The storage device 3250 may include a secure element (SE) for security or privacy.

While the disclosure has been particularly shown and described with reference to embodiments thereof, it will be understood that various changes in form and details may be made therein without departing from the spirit and scope of the following claims.

What is claimed is:

1. A system comprising:
   a heterogeneous memory system comprising a memory module and a high bandwidth memory (HBM), the HBM including a processing-in-memory (PIM) circuit and configured to store data;
   a host processor configured to:
      execute arithmetic operations of the system, and
      allocate one or more of the arithmetic operations to the PIM circuit to be executed by the PIM circuit; and
   a memory controller configured to detect a data array from the memory module or the HBM based on a border index value,
   wherein the border index indicates a criterion to determine which memory, among the memory module and the HBM, stores the data array required for the one or more of the arithmetic operations, based on the one or more of the arithmetic operations corresponding to a kernel offloaded by the host processor being performed in the PIM circuit of the HBM.

2. The system of claim 1, wherein the border index value is set based on a utilization frequency of the data array or a bandwidth ratio between the memory module and the HBM.

3. The system of claim 1, wherein the memory controller is further configured to receive information on the offloaded kernel from the host processor, and
   wherein the information on the offloaded kernel includes an identification number of the data array, a base address of the data array corresponding to the identification number, an index value representing an offset from the base address, and a data size.

4. The system of claim 3, wherein the memory controller is further configured to compare the index value with the border index value and determine that the data array is stored in the HBM when the index value is less than the border index value.

5. The system of claim 4, wherein the memory controller includes an HBM mapping table and is further configured to read a base address of the HBM, which corresponds to the base address of the data array, from the HBM mapping table.

6. The system of claim 5, wherein the memory controller is further configured to calculate a first address corresponding to a position offset from the base address of the HBM by the index value, calculate a second address corresponding to a value obtained by multiplying the first address by the data size, and determine that the data array is stored in a physical address space from the first address to the second address of the HBM.

7. The system of claim 6, wherein the memory controller is further configured to allocate a register configured to store an intermediate result value generated by an operation processing performed by the PIM circuit of the HBM by using the data array stored in the HBM.

8. The system of claim 7, wherein the memory controller is further configured to generate an HBM command set instructing the PIM circuit of the HBM to perform the operation processing,
   wherein the HBM command set includes an opcode parameter, a vector size parameter, a source parameter, and a destination parameter, and
   wherein the opcode parameter indicates a command of the offloaded kernel, the vector size parameter indicates a correlation between an amount of data inputs and outputs of a DRAM cache line combined with the host processor and an amount of data inputs and outputs of the data array, the source parameter indicates an address of the HBM corresponding to the data array, and the destination parameter indicates an identification number of the allocated register.

9. The system of claim 3, wherein the memory controller is further configured to compare the index value with the border index value and determines that the data array is stored in the memory module when the index value is greater than the border index value.

10. The system of claim 9, wherein the memory controller comprises a memory module mapping table and is further configured to read a base address of the memory module, which corresponds to the base address of the data array, from the memory module mapping table.

11. The system of claim 10, wherein the memory controller is further configured to calculate a third address corresponding to a position offset from the base address of the memory module by a value obtained by subtracting the border index value from the index value, calculates a fourth address corresponding to a value obtained by multiplying the third address by the data size, and determine that the data array is stored in a physical address space from the third address to the fourth address of the memory module.

12. The system of claim 11, wherein the memory controller is further configured to allocate a register configured to store an intermediate result value generated by an operation processing performed by the PIM circuit of the HBM by using the data array stored in the memory module.

13. A method implemented by a system including a heterogeneous memory system including a memory module and high bandwidth memory (HBM) including a processing-in-memory (PIM) circuit, the method comprising:
offloading, by a host processor, a kernel on the heterogeneous memory system;
storing, by a memory controller, a border index value that indicates which memory, among the memory module and the HBM, stores a data array to be processed in accordance with execution of a working code of the offloaded kernel;
receiving, by the memory controller, information on the offloaded kernel, which comprises an identification number of the data array, a base address of the data array corresponding to the identification number, an index value representing offset from the base address, and a data size;
comparing, by the memory controller, the index value of the data array with the border index value;
determining, by the memory controller, that the data array is stored in the HBM when the index value is less than the border index value and determining the data array is stored in the memory module when the index value is greater than the border index value;
generating, by the memory controller, a memory module command set instructing the PIM circuit of the HBM to execute the working code by using the data array stored in the memory module; and
generating, by the memory controller, an HBM command set instructing the PIM circuit of the HBM to execute the working code by using the data array stored in the HBM.

14. The method of claim 13, wherein the border index value is set based on a utilization frequency of the data array or a bandwidth ratio between the memory module and the HBM.

15. The method of claim 13, wherein the HBM command set includes an opcode parameter, a vector size parameter, a source parameter, and a destination parameter, and
wherein the opcode parameter indicates as a command of the offloaded kernel, the vector size parameter indicates a correlation between an amount of data inputs and outputs of a DRAM cache line combined with the memory controller and an amount of data inputs and outputs of the data array, the source parameter indicates an address of the HBM corresponding to the data array, and the destination parameter indicates an identification number of an allocated register.

16. The method of claim 13, wherein the memory module command set includes an opcode parameter, a vector size parameter, a vector position parameter, an immediate value parameter, and a destination parameter, and
wherein the opcode parameter indicates a command of the offloaded kernel, the vector size parameter indicates a correlation between an amount of data inputs and outputs of a DRAM cache line combined with the memory controller and an amount of data inputs and outputs of the data array, the vector position parameter indicates a position of data utilized by a current command in the data array, the immediate value parameter indicates a partial data value of the data array retrieved from the memory module, and the destination parameter indicates an identification number of an allocated register.

17. The method of claim 13, wherein a plurality of memory dies are stacked in the HBM and each of the plurality of memory dies comprises the PIM circuit.

18. A device comprising:
a memory storing one or more instructions; and
a processor configured to execute the one or more instructions to:
receive an index value of a data array corresponding to one or more arithmetic operations;
comparing the index value of the data array with a border index value;
transmit a first command set corresponding to the one or more arithmetic operations to a high bandwidth memory (HBM) based on the index value being less than the border index value; and
transmit a second command set corresponding to the one or more arithmetic operations to a memory module based on the index value being greater than the border index value.

19. The device of claim 18, wherein the first command set includes instruction to instruct a processing-in-memory (PIM) circuit of the HBM to perform the one or more arithmetic operations by using the data array stored in the HBM.

20. The device of claim 18, wherein the second command set includes instruction to instruct a processing-in-memory (PIM) circuit of the HBM to perform the one or more arithmetic operations by using the data array stored in the memory module.

* * * * *